Nov 2, 1937. L. A. BOUSSEL 2,097,962
REMOTE CONTROL FOR MACHINE GUNS
Filed Oct. 12, 1935 3 Sheets-Sheet 1
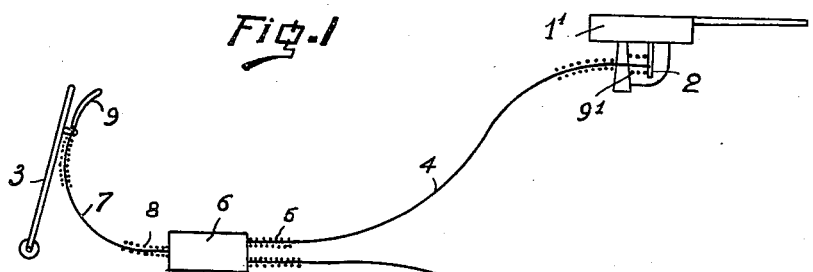
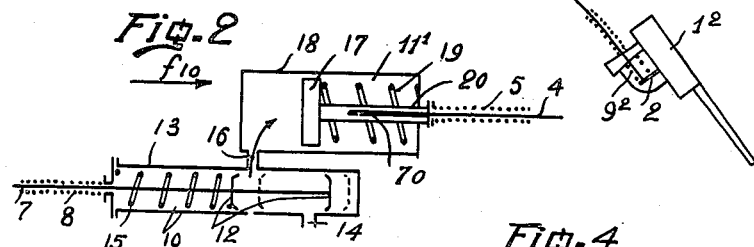
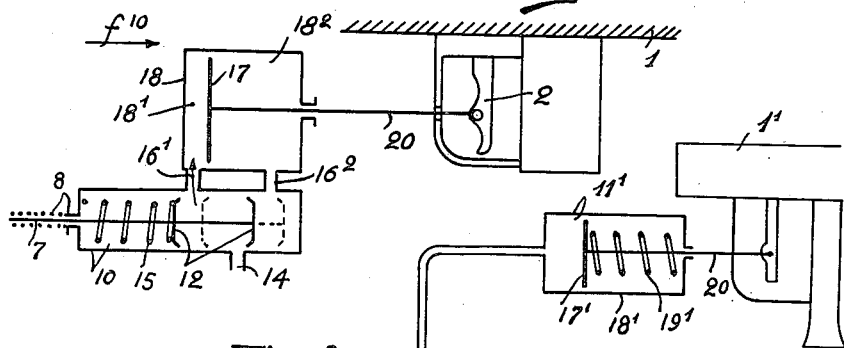
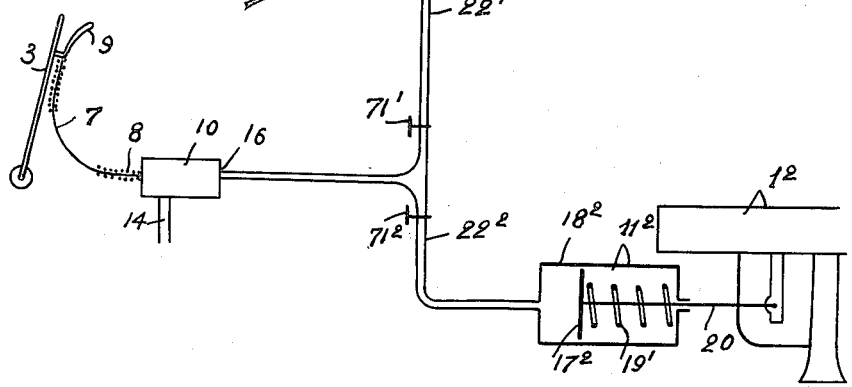
Inventor
Lucien A. Boussel
by Wilkinson & Mawhinney
Attorneys

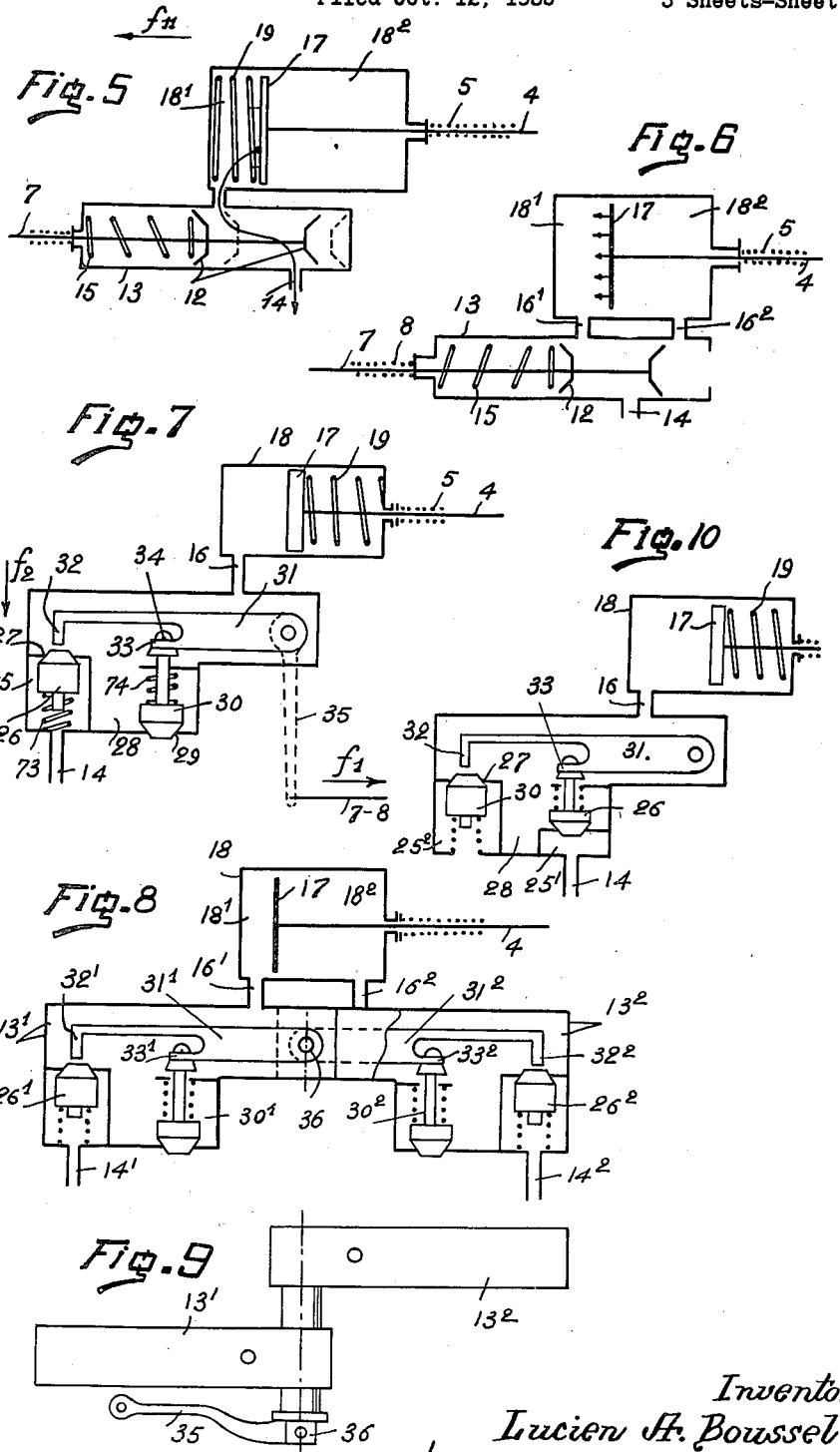

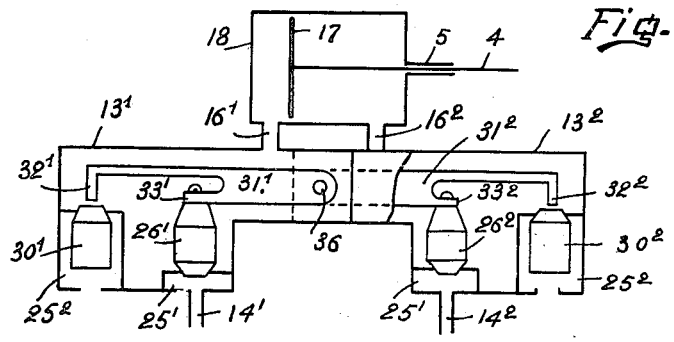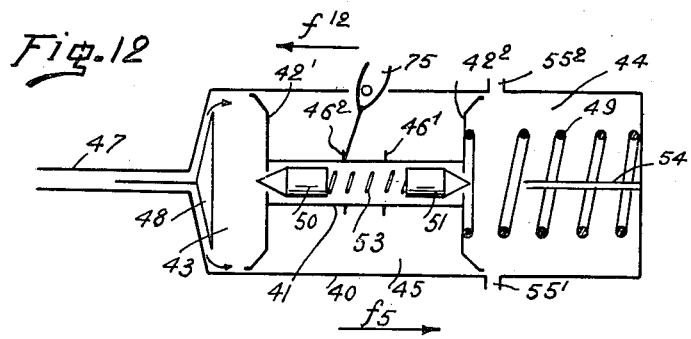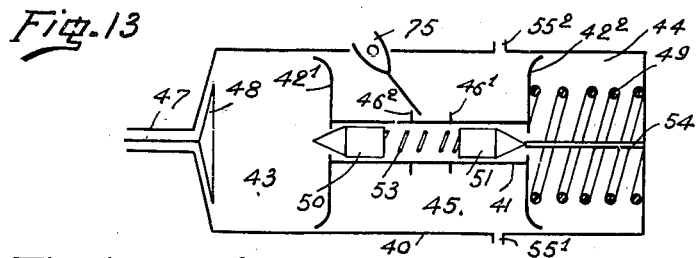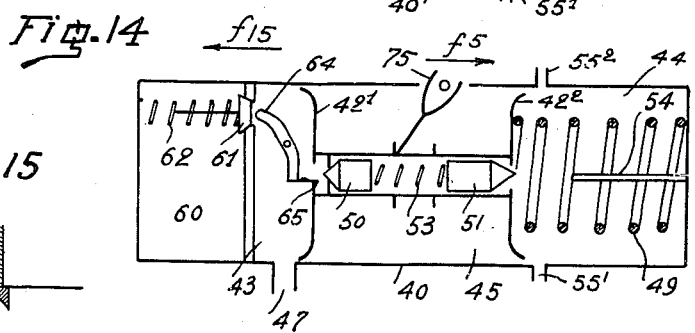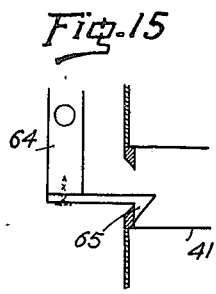

Patented Nov. 2, 1937

2,097,962

UNITED STATES PATENT OFFICE 2,097,962

REMOTE CONTROL FOR MACHINE GUNS

Lucien Albert Boussel, Courbevoie, France, assignor to Societe Anonyme des Anciens Etablissements Hotchkiss & Cie., Seine, France, a joint stock company of France Original application May 10, 1935, Serial No. 20,841. Divided and this application October 12, 1935, Serial No. 44,805. In Great Britain May 1, 1935

11 Claims. (Cl. 89—27)

The present invention concerns a means for controlling at a distance the firing of machine guns or other similar weapons, and wherein the actuating members acting on the trigger of the machine are controlled by the same relay, which is itself controlled by a single actuating member placed near the firer. This arrangement enables the force necessary for operating the control members of the machine guns to be reduced to a minimum, thereby permitting said machine guns to be placed without difficulty at a considerable distance from the fire-control position.

According to an embodiment, the relay is combined with selecting members in such a manner that said relay can act either on all the machine guns simultaneously, or on each of them successively.

According to an embodiment, the actuating members acting on the trigger are constituted by Bowden cables, one end of which is secured to the trigger, and the other to the moving member of the lever.

The member actuating the relay is likewise constituted by a Bowden cable connected to an operating handle placed near the firer.

According to an embodiment, the relay has a distributor member and an actuating member constituting the moving element which acts on the actuating members of the various machine guns.

The invention also covers a particular form of construction of the distributor, said distributor being constituted by a servo-motor in which one of the faces of the piston is subjected to a pressure which is substantially greater than the pressure necessary for displacing said piston, the excess pressure being applied to the other face of the piston and kept in reserve until there is a suitable drop in the pressure applied to the first face, the piston then returning rapidly to its initial position under the action of a return member.

According to a modification, the servo-motor is combined with an additional capacity filled with a fluid under pressure let into said capacity during the preceding firing, this reservoir having an exhaust member controlled by the piston of the servo-motor when the latter begins its movement under the action of an auxiliary pressure, in such a manner that the gas introduced suddenly on the piston causes the rapid displacement of said piston.

The invention furthermore covers other characteristics described hereinafter, and various combinations of same.

Devices according to the invention are shown by way of example in the accompanying drawings, in which:

Fig. 1 is a general diagrammatic view of an arrangement for the remote control of two machine guns by means of a device according to the invention.

Fig. 2 is a longitudinal section of a single-acting relay forming part of the arrangement of Fig. 1, and operating by means of a compressed fluid.

Fig. 3 is a diagrammatic view of a modification of the arrangement shown in Figure 1.

Fig. 4 is a longitudinal section of a double-acting relay.

Fig. 5 is a longitudinal section of a single-acting relay operating by the suction of the motor.

Fig. 6 is a longitudinal section of a double-acting relay operating in the same manner as the preceding one.

Fig. 7 is a longitudinal section of a single-acting relay according to another embodiment, and operating by means of a compressed gas.

Fig. 8 is a longitudinal section of a relay of the same type as the preceding one, but double-acting.

Fig. 9 is a partial plan view of the distributor of said relay.

Figs. 10 and 11 are longitudinal sections of two modifications of the relays of Figs. 7 and 8 respectively adapted to operate by the suction of the motor.

Fig. 12 is a longitudinal section of a servo-motor according to the invention for controlling the firing of a machine gun.

Fig. 13 is a similar view of the same servo-motor in different position.

Fig. 14 is a longitudinal section of a modification of the servo-motor of Figs. 12 and 13.

Fig. 15 is a partial section showing the detail of the control of the reservoir.

The arrangement shown diagrammatically in Fig. 1 is for example mounted on an aeroplane; it comprises two machine guns $1^1$, $1^2$, the triggers 2 of which can be actuated simultaneously from the pilot's seat which is placed near the control column 3 known as the "joy stick".

For this purpose, the trigger 2 of each machine gun $1^1$, $1^2$, is controlled by an actuating member constituted by a Bowden cable having a wire 4 and a sheath 5; these various cables are connected to the moving element of a relay 6 which centralizes the controls. The control member of the relay 6 is itself controlled by a Bowden cable having a wire 7 and a sheath 8.

The wires 4 of the Bowden cables are fixed on the one hand to the trigger 2 of the machine guns $1^1$, $1^2$ and, on the other hand, to the moving element of the relay 6.

The wire 7 of the Bowden cable 8 is connected on the one hand to the control member of the relay 6 and, on the other hand, to a handle 9 pivotally mounted on the control stick 3, in such a manner that said handle 9 can be easily manipulated by the pilot.

When the handle 9 is operated, the control member of the relay 6 moves and operates the relay 6 which carries with it all the actuating cables 4, 5 which are connected to it; these cables then act on the triggers 2 of the machine guns $1^1$, $1^2$ to start the firing.

On the contrary, when all action on the control lever 9 is stopped, a return spring $9^1$ $9^2$, for example, returns the triggers 2 to the position of rest to cease the firing.

The relay 6, controlled by the pilot by means of the Bowden cable 7, 8, is advantageously constituted by two members; a moving element or actuating member and a distributor including the control member.

The actuating member which acts directly on the triggers 2 of the machine guns is rendered operative by a fluid under pressure or under reduced pressure, and the inlet of said fluid toward said actuating member is controlled by the distributor.

In the embodiment shown in Fig. 1, the actuating member and the distributor are grouped in the same unit shown in detail in Fig. 2; this relay has, on the other hand, a distributor 10 and two actuating members such as $11^1$, corresponding respectively to the machine guns $1^1$, $1^2$. Only one of these actuating members is shown in Fig. 2, the other being identical with the one shown and being adjacent to it.

The distributor 10 is constituted by a piston valve 12 which is displaceable in a valve chest 13; a pipe 14 supplying fluid under pressure, compressed air for example, is connected to said chest 13.

In its inoperative position, the piston valve 12, urged by the return spring 15, closes the inlet port 16 leading towards the actuating members $11^1$. On the other hand, said piston valve 12 can be displaced in the valve chest 13 by means of the Bowden cable 7, 8.

Each of the actuating members $11^1$, is constituted by a piston 17 displaceable in a cylinder 18. The piston 17 is urged in one direction by a return spring 19, and in the other direction by the action of the compressed air which is introduced into the cylinder 18 when the communication port 16 is open.

The rod 20 of the piston 17 is hollow and slit so as to enable said rod to slide on a fixed pin 70 to which is fixed the wire 4 of the Bowden cable. On the other hand, the sheath 5 of the Bowden cable presses against the end of the rod 20; consequently, when the piston 17 moves in the direction of the arrow $f^{10}$ under the action of the compressed fluid introduced at 16, the rod 20 pushes back the sheath 5 of the Bowden cable; the inner wire 4 is taut and acts on the trigger 2 of the machine gun.

Conversely, when the inlet port 16 is closed by the piston valve 12, the spring 19 retracts the piston 17 in the opposite direction to $f^{10}$, the wire 4 of the Bowden cable slackens, and the firing of the machine gun ceases.

Numerous modifications may be made in the arrangement described with reference to Figs. 1 and 2; in the modification of Fig. 3, the distributor 10 of the relay is placed near the pilot's seat, whereas the actuating members $11^1$, $11^2$, of said relays are placed on the machine guns $1^1$, $1^2$, and act directly on the triggers 2 of said machine guns. In this arrangement the cylinders $18^1$, $18^2$ of the actuating members are connected through pipes $22^1$, $22^2$ to the outlet pipe 16 of the distributor 10. The cocks $71^1$, $71^2$, forming selection members, control the pipes $22^1$, $22^2$.

The operation is exactly similar to that of the arrangement of Figs. 1 and 2. However, the cocks $71^1$, $71^2$ enable the pilot, according to the conditions of the combat, to cause the relay to act either simultaneously on all the machine guns, or any number of them.

In the preceding examples, it has been assumed that the actuating member of the relay is single-acting, that is to say that only one of the faces of the piston 17 of said actuating member is subjected to the action of the fluid under pressure, whereas said piston can only be brought back in the opposite direction by the action of a return spring 19 acting on the other face of the piston.

On the contrary, in the embodiment of Fig. 4, the actuating member is double-acting, that is to say, that the fluid acts successively on both faces of the piston 17; it is thus possible to dispense with any return spring.

For this purpose, the valve chest 13 is provided with two ports $16^1$, $16^2$, which communicate with the cylinder 18 on either side of the piston 17. When the actuating cable 7, 8 is not acted on, the piston valve 12 is in the position shown in dotted lines in Fig. 4, and uncovers the port $16^2$; the compressed fluid is admitted into the chamber $18^2$ of the cylinder 18, so that the rod 20 of the piston 17 holds the trigger 2 in the inoperative position. On the contrary, when the actuating cable 7, 8 is operated, the piston valve 12 is displaced in the opposite direction to $f^{10}$ and takes up the position shown in full lines in Fig. 4; the port $16^2$ is closed, whereas the port $16^1$ is opened; the compressed fluid admitted into the chamber $18^1$ of the cylinder 18 pushes back the piston 17 in the direction of $f^{10}$, the rod 20 of said piston acting directly on the trigger 2 and opening the fire.

The double-acting distributor, which successively admits the compressed fluid to both faces of the piston, enables the simultaneous displacements of the piston in both directions to be effected without the aid of any return spring.

In the preceding examples it has been assumed that a compressed fluid is used as a motive power; on the contrary, another motive power can be used such as the depression in atmospheric pressure created by the suction of a motor; this arrangement may be advantageous when the apparatus is mounted in a motor driven vehicle, such as an aeroplane in particular.

One mode of construction of a single-acting relay operating by means of the suction of the motor is illustrated in Fig. 5; the valve chest 13 is connected through its tube 14 to the suction pipe of the motor.

The piston 17 of the actuating member 11 is urged in its position of rest by a return spring 19 which is arranged on that face on which the suction is to act.

When the piston valve 12 is displaced in the direction of $f^{11}$ so as to bring it from the position in dotted lines to the position in full lines of Fig. 5, the chamber $18^1$ of the cylinder 18 is placed in communication with the suction of the motor; a depression is created in the said chamber $18^1$; the atmospheric pressure of the chamber $18^2$ becomes predominant and pushes back the piston 17 in the direction of $f^{11}$, compressing the return spring 19.

When the piston valve 12 returns to its position of rest, pressures are balanced in the two chambers $18^1$, $18^2$ of the cylinder 18 and the return spring 19 returns the piston 17 to its initial position.

The suction of the motor can be made to act successively on both faces of the piston 17 so as to eliminate the return spring. In one form of construction of such double-acting relay, shown in Fig. 6, the piston valve 12 successively uncovers the ports $16^1$, $16^2$, so that the suction of the motor creates a depression in the chamber $18^1$, then in the chamber $18^2$, to effect the successive displacements of the piston 17 in both directions.

Numerous modifications may be made in the construction of the distributor controlling the inlet of the fluid to the actuating member of the relay.

In the modification of Fig. 7, the distributor is constituted by a valve chest 13 having, on the one hand, a fluid inlet tube 14 and an outlet tube 16 connecting said valve chest to the actuating member.

The valve chest 13 has an auxiliary chamber 25 in which is displaceably mounted an inlet valve 26 controlling the communication 27 of the auxiliary chamber 25 with the main chamber 28. On the other hand, said main chamber 28 communicates with the atmosphere by an orifice 29 which is closed by an exhaust valve 30.

The inlet valve 26 is pressed against a seat 27 by the combined actions of a spring 73 and by the compressed fluid introduced into the auxiliary chamber 25. The exhaust valve 30 rests on its seat 29 under the pressure of a spring 74.

The two valves 26 and 30 are controlled by the same operating member constituted by a rocking lever 31 pivotally mounted in the valve chest 13; said lever 31 has a nose 32 arranged above the inlet valve 26 and a hook 33 in which engages a ring 34 secured to the exhaust valve 30.

Said operating lever 31 is controlled by an outer handle 35 connected to an operating member, such as the Bowden cable 7, 8, said cable being actuated by the firer.

This distributor operates in the following manner: when it is desired to operate the actuating member of the relay to start firing the machine gun, the firer acts as previously on the operating cable 7, 8 which pulls the handle 35 in the direction of $f^1$. The rocking lever 31 moves downwards in the direction of $f^2$; the nose 32 of said lever engages the inlet valve 26 and moves it off its seat 27, the fluid under pressure thus passes from the auxiliary chamber 25 into the main chamber 28 to pass towards the actuating member of the relay through the tube 16.

In the converse operation, the lever 31 rocks in the opposite direction to $f^2$, the inlet valve 26 which is released from the thrust of the nose 32 returns in the opposite direction to $f^2$ under the pressure of the compressed air, and closes the communication 27; the lever 31 continuing its movement in the opposite direction to $f^2$ raises, by means of its hook 33, the ring 34; the valve 30 rises above its seat 29, so that the compressed fluid in the main chamber 28 can escape into the atmosphere. The distributor thus constructed is a single-acting distributor, that is to say, that said distributor acts in only one direction on the actuating member for operating the trigger, a return member acting in the other direction.

A double-acting valve distributor can also be constructed similar to the preceding one, but enabling the return spring of the actuating member to be eliminated.

Such a distributor is illustrated in Figs. 8 and 9, and has a double set of valves mounted in two aligned valve chambers $13^1$, $13^2$, said two valve chambers $13^1$, $13^2$ are respectively in communication with the chambers $18^1$, $18^2$ of the cylinder in which the piston 17 of the actuating member moves.

The levers $31^1$, $31^2$ controlling the set of valves $26^1$, $30^1$ and $26^2$, $30^2$ are symmetrically secured to the same pin 36 operated by a single handle 35.

In the modification illustrated in Fig. 10, the valve distributor operates by the suction of the motor; in this case, the inlet valve 26 is controlled by the hook 33 of the lever 31, whereas the nose 32 of the lever 31 engages the exhaust valve 30 which moves in an auxiliary chamber $25^2$ communicating with the outer air.

When it is desired to operate the actuating member of the relay, the lever 31 is caused to raise the inlet valve 26; the depression of the motor prevails in the valve chamber 13 as well as in the actuating member.

In the converse movement, the inlet valve 26 is pressed on its seat, whereas the nose 32 of the lever 31 pushes the exhaust valve 30 back to reestablish the normal pressure within the distributor.

The distributor illustrated in Fig. 11 is double-acting and operates as the one of Fig. 10 by the suction of the motor; it has only a symmetrical arrangement with a double set of valves controlled by a single operation.

In order to obtain the rapid firing of the machine guns, according to the invention, a compensated servo-motor is used, as shown by way of example in Figs. 12 and 13; said servo-motor is constructed in the following manner:

A tubular slide 41 is displaceable in a cylinder 40 and carries at its two ends, pistons $42^1$ and $42^2$; between said pistons and the cylinder 40 are formed chambers 43 and 44, whereas a rocking lever 75 penetrates into the intermediate chamber 45 and operates the trigger 2 of the machine gun; said lever is actuated by stops $46^1$, $46^2$ fixed to the medial portion of the tubular slide 41.

A compressed fluid pipe 47 is connected to the chamber 43; the fluid is evenly distributed over the face of the piston $42^1$ by means of a baffle 48.

In the chamber 44 is mounted a return spring 49 which bears on the piston $42^2$ and which urges the piston unit in the direction of $f^{12}$ towards the chamber 43; the chamber 44 is placed in communication with the atmosphere by tubes $55^1$, $55^2$.

The chambers 43 and 44 can communicate with each other through the tubular slide 41, the ends of which are closed by the valves 50 and 51; one of these, the valve 50, is called "compensating" valve, and the other 51 "safety" valve; a suitably calibrated spring 53 is interposed between the said two valves 50 and 51.

Finally, a fixed rod 54 forming a stop is carried by the end of the cylinder 40 coaxial with the valve 51, so as to lift said valve from its seat when the piston unit moves along $f^5$ towards the chamber 44, as will be explained hereinafter.

The servo-motor thus constituted operates in the following manner:

A fluid is introduced into the pipe 47 at a pressure (for example from 5 to 15 kilogrammes per square centimetre) greater than that necessary for operating the apparatus, which only requires, for example, a pressure of 300 grammes per sq. cm.

The piston unit thus moves in the cylinder 40 in the direction of the arrow $f^5$.

The mass of compressed air introduced into the chamber 43 has the effect not only of displacing the piston unit $42^1$, $42^2$ in the direction of $f^5$, but also of raising the valve 50, said mass of compressed air thus passing from the chamber 43 through the tubular slide 41 towards the chamber 44, since at this instant the valve 51 has abutted against the rod 54 which has raised it from its seat.

As soon as the apparatus has operated (Fig. 13), and has displaced the trigger 2 of the machine gun to start the firing, the pressure in the chamber 43 remains greater than that which is created in the chamber 44, and this difference of pressure which is controlled by the valve 50 having a loaded spring 53, is sufficient to hold the return spring 49 under tension.

When it is desired to cease firing, the pipe 47 is placed in communication with the outer air; as soon as the pressure in the chamber 43 is equal to that in the chamber 44, the return spring 49 brings back the piston unit to its initial position, the valve 51 closes and the fluid under pressure in the chamber 44 escapes through the tubes $55^1$, $55^2$.

A servo-motor is thus provided in which the differences of pressure are considerable, thereby enabling an operation of the control and the starting of the firing of the machine gun to be obtained in a very rapid manner.

In the modification illustrated in Fig. 14, the cylinder 40 has an additional capacity 60 which communicates with the chamber 43 through the instrumentality of a valve 61 loaded by a calibrated spring 62.

Said valve 61 is controlled by a rocking lever 64 controlled by the piston $42^1$ through a slip connection 65 illustrated in detail in Fig. 15.

When the fluid under pressure is introduced into the chamber 43, the piston $42^1$ displaces the piston unit towards the chamber 44.

At the beginning of the movement, the rocking lever 64 is carried along by the piston $42^1$, so that said lever 64 in rocking, bears in the direction of $f^{15}$ on the valve 61 by acting against the tension of the spring 62, and against the pressure of the compressed fluid in the additional capacity 60.

This mass of fluid, which has been introduced into said capacity 60 during the preceding firing, is suddenly released and causes alone the displacement in the direction of $f^5$ of the piston unit for actuating the trigger as in the preceding example. After a certain travel, the rocking lever 64 becomes disengaged from the piston $42^1$, so that the valve 61 being released, closes again the additional capacity 60 and again imprisons therein the fresh mass of fluid introduced by the pipe 47. This capacity is thus automatically charged at a pressure nearly equal to that introduced into the chamber 43.

It is therefore possible to still further reduce the time necessary for actuating the piston unit, since the pressure introduced into the chamber 43 only now serves to overcome the friction and to open the valve 61 of the auxiliary capacity 60.

Devices are thus provided which permit the remote control of machine guns under easy, rapid, and reliable conditions of operation, with a minimum expenditure of energy.

I claim:

1. Power means for the remote control of a plurality of machine guns, comprising a single control handle, a repeating relay which includes a distributor of the valve type and motor means of the fluid operated cylinder and piston type having only one inlet end connected to said distributor, a passage from said inlet end to the opposite end of said motor means, valve means operated responsive to the admission of the fluid in said inlet end and adapted when so operated to open said passage in order to allow fluid pressure to pass into said opposite end, reducing means causing fluid pressure in said opposite end to act on the piston with less force than fluid pressure in said inlet end to provide a differential force capable of holding the piston in said opposite end as long as fluid pressure is supplied to said inlet end, an auxiliary fluid container near said inlet end, a passage from said container into said inlet end, a check valve in said passage, means operated by the piston and adapted to depress said check valve when said piston starts from said inlet end and to let it close again when the piston approaches the opposite end, and operative connection between said handle and said distributor and operative connections between said motor means and the triggers of the machine guns to impart to said triggers the control movement of said handle.

2. Power means for the remote control of a plurality of machine guns, comprising a single control handle, a repeating relay which includes a distributor of the valve type and motor means of the fluid operated cylinder and piston type having only one inlet end connected to said distributor, a passage from said inlet end to the opposite end of said motor means, valve means operated responsive to the admission of the fluid in said inlet end and adapted when so operated to open said passage in order to allow fluid pressure to pass into said opposite end, reducing means causing fluid pressure in said opposite end to act on the piston with less force than fluid pressure in said inlet end to provide a differential force capable of holding the piston in said opposite end as long as fluid pressure is supplied to said inlet end, an auxiliary fluid container near said inlet end, a passage from said container into said inlet end, a check valve in said passage, a rocker in said inlet end, a slip connection between said rocker and said piston, said rocker being adapted to depress said check valve when the piston starts from said inlet end and said slip connection being adapted to release said rocker when said piston approaches the opposite end so as to let said check valve close again, and operative connection between said handle and said distributor and operative connections between said motor means and the triggers of the machine guns to impart to said triggers the control movement of said handle.

3. A fluid operated servo-motor arrangement, comprising a motor of the cylinder and piston type, the motor cylinder having a rear inlet end and a front bottom end providing a chamber before the motor piston in its foremost position, a connection only from said inlet end of the motor to a source of compressed fluid, a control valve in said connection and adapted to connect said inlet end either to said source or to exhaust, a passage from said inlet end to said bottom end, automatic valve means adapted only when said inlet end is supplied with compressed fluid to open said passage, reducing means causing the compressed fluid in said bottom end to act on the motor piston with less force than in said inlet end for providing a differential force urging the piston to its foremost position as long as said inlet end is supplied with compressed fluid, and return means, including the compressed fluid in said chamber, causing said piston to return to its rearmost position responsive to exhaustion of said inlet end.

4. A fluid operated servo-motor arrangement, comprising a motor of the cylinder and piston type, the motor cylinder having a rear inlet end and a front bottom end providing a chamber before the motor piston in its foremost position, a connection only from said inlet end of the motor to a source of compressed fluid, a control valve in said connection and adapted to connect said inlet end either to said source or to exhaust, a passage from said inlet end to said bottom end, a loaded valve in said passage and which the fluid has to lift so as to pass into said bottom end with a reduced pressure, thereby to provide a differential force urging the piston to its foremost position as long as said inlet end is supplied with compressed fluid, and return means, including the compressed fluid in said chamber, causing said piston to return to its rearmost position responsive to exhaustion of said inlet end.

5. A fluid operated servo-motor arrangement, comprising a motor of the cylinder and piston type, the motor cylinder having a rear inlet end and a front bottom end providing a chamber before the motor piston in its foremost position, a connection only from said inlet end of the motor to a source of compressed fluid, a control valve in said connection and adapted to connect said inlet end either to said source or to exhaust, a passage from said inlet end to said bottom end, valve means operated by the piston upon effecting a given section of its direct stroke and adapted, when so operated, to open said passage, reducing means causing the compressed fluid in said bottom end to act on the motor piston with less force than in said inlet end for providing a differential force urging the piston to its foremost position as long as said inlet end is supplied with compressed fluid, and return means, including the compressed fluid in said chamber, causing said piston to return to its rearmost position responsive to exhaustion of said inlet end.

6. A fluid operated servo-motor arrangement, comprising a motor of the cylinder and piston type, the motor cylinder having a rear inlet end and a front bottom end providing a chamber before the motor piston in its foremost position, a connection only from said inlet end of the motor to a source of compressed fluid, a control valve in said connection and adapted to connect said inlet end either to said source or to exhaust, a passage from said inlet end to said bottom end, automatic valve means, including a check valve in said passage, adapted, only when said inlet end is supplied with compressed fluid, to open said passage, reducing means causing the compressed fluid in said bottom end to act on the motor piston with less force than in said inlet end for providing a differential force urging the piston to its foremost position as long as said inlet end is supplied with compressed fluid, and return means, including the compressed fluid in said chamber, causing said piston to return to its rearmost position responsive to exhaustion of said inlet end.

7. A fluid operated servo-motor arrangement, comprising a motor of the cylinder and piston type, the motor cylinder having a rear inlet end and a front bottom end providing a chamber before the motor piston in its foremost position, a connection only from said inlet end of the motor to a source of compressed fluid, a control valve in said connection and adapted to connect said inlet end either to said source or to exhaust, a passage from said inlet end to said bottom end, automatic valve means adapted, only when said inlet end is supplied with compressed fluid, to open said passage, reducing means causing the compressed fluid in said bottom end to act on the motor piston with less force than in said inlet end for providing a differential force urging the piston to its foremost position as long as said inlet end is supplied with compressed fluid, and return means, including the compressed fluid in said chamber and a spring, causing said piston to return to its rearmost position responsive to exhaustion of said inlet end.

8. A fluid operated servo-motor arrangement, comprising a motor of the cylinder and piston type, the motor cylinder having a rear inlet end and a front bottom end providing a chamber before the motor piston in its foremost position, a connection only from said inlet end of the motor to a source of compressed fluid, a control valve in said connection and adapted to connect said inlet end either to said source or to exhaust, a passage from said inlet end to said bottom end, automatic valve means adapted, only when said inlet end is supplied with compressed fluid, to open said passage, reducing means causing the compressed fluid in said bottom end to act on the motor piston with less force than in said inlet end for providing a differential force urging the piston to its foremost position as long as said inlet end is supplied with compressed fluid, return means including the compressed fluid in said chamber, causing said piston to return to its rearmost position responsive to exhaustion of said inlet end, and exhaust ports in said bottom end and so controlled by the piston that they are opened and thus cause exhaustion of said bottom end when said piston is in its rearmost position.

9. A fluid operated servo-motor arrangement, comprising a motor of the cylinder and piston type, the motor cylinder having a rear inlet end with an inlet opening and a baffle in front of same and a front bottom end providing a chamber before the motor piston in its foremost position, a connection only from said inlet opening of the motor to a source of compressed fluid, a control valve in said connection and adapted to connect said inlet end either to said source or to exhaust, the pressure of the fluid supplied into said inlet end being distributed by said baffle, a passage from said inlet end to said bottom end, automatic valve means adapted, only when said inlet end is supplied with compressed fluid, to open said passage, reducing means causing the compressed fluid in said bottom end to act on the motor piston with less force than in said inlet end for providing a differential force urging the piston to its foremost position as long as said inlet end is supplied with compressed fluid, and return means, including the compressed fluid in said chamber, causing said piston to return to its rearmost position responsive to exhaustion of said inlet end.

10. A fluid operated servo-motor arrangement, comprising a motor of the cylinder and piston type, the motor cylinder having a rear inlet end and a front bottom end providing a chamber before the motor piston in its foremost position, a booster container at said inlet end, a port from said container into said inlet end, a check valve in said port, means operated by the motor piston and adapted to depress said check valve when said piston starts from said inlet end and to let it close again when the piston approaches said bottom end, a connection only from said inlet end of the motor to a source of compressed fluid, a control valve in said connection and adapted to connect said inlet end either to said source or to exhaust, a passage from said inlet end to said bottom end, automatic valve means adapted, only when said inlet end is supplied with compressed fluid, to open said passage, reducing means causing the compressed fluid in said bottom end to act on the motor piston with less force than in said inlet end for providing a differential force urging the piston to its foremost position as long as said inlet end is supplied with compressed fluid, and return means, including the compressed fluid in said chamber, causing said piston to return to its rearmost position responsive to exhaustion of said inlet end.

11. A fluid operated servo-motor arrangement, comprising a motor of the cylinder and piston type, a motor cylinder having a rear inlet end and a front bottom end providing a chamber before the motor piston in its foremost position; a booster container at said inlet end, a port from said container into said inlet end, a check valve in said port, a rocker in said inlet end, a slip connection between said rocker and said piston, said rocker being adapted to depress said check valve when the piston starts from said inlet end and said slip connection being adapted to release said rocker when said piston approaches said bottom end, so as to let said check valve close again, a connection only from said inlet end of the motor to a source of compressed fluid, a control valve in said connection and adapted to connect said inlet end either to said source or to exhaust, a passage from said inlet end to said bottom end, automatic valve means adapted, only when said inlet end is supplied with compressed fluid, to open said passage, reducing means causing the compressed fluid in said bottom end to act on the motor piston with less force than in said inlet end for providing a differential force urging the piston to its foremost position as long as said inlet end is supplied with compressed fluid, and return means, including the compressed fluid in said chamber, causing said piston to return to its rearmost position responsive to exhaustion of said inlet end.

LUCIEN ALBERT BOUSSEL.